March 27, 1956  J. KOLBE  2,739,658
BANKING VEHICLE WITH SUPERSTRUCTURE SUPPORTING
TORSION SPRINGS AND KING-PIN BANKING HINGES
Filed Aug. 9, 1954  4 Sheets-Sheet 1

FIG. I.

INVENTOR.
JOACHIM KOLBE
BY Andrus & Scealer
Attorneys

March 27, 1956   J. KOLBE   2,739,658
BANKING VEHICLE WITH SUPERSTRUCTURE SUPPORTING
TORSION SPRINGS AND KING-PIN BANKING HINGES
Filed Aug. 9, 1954   4 Sheets-Sheet 2

INVENTOR.
JOACHIM KOLBE

BY
Attorneys

FIG. 4.

INVENTOR.
JOACHIM KOLBE

March 27, 1956 J. KOLBE 2,739,658
BANKING VEHICLE WITH SUPERSTRUCTURE SUPPORTING
TORSION SPRINGS AND KING-PIN BANKING HINGES
Filed Aug. 9, 1954 4 Sheets-Sheet 4

INVENTOR.
JOACHIM KOLBE
BY
Andrus & Scales
Attorneys

United States Patent Office 2,739,658
Patented Mar. 27, 1956

2,739,658

BANKING VEHICLE WITH SUPERSTRUCTURE SUPPORTING TORSION SPRINGS AND KING-PIN BANKING HINGES

Joachim Kolbe, Menomonee Falls, Wis.

Application August 9, 1954, Serial No. 448,481

16 Claims. (Cl. 180—73)

This invention relates to automobiles designed to bank during curve ride and comprising wheel suspensions for pairs of independently suspended wheels or for wheel supported rigid axle structures which are characterized by a new variation of banking arms.

Banking arms have been disclosed and defined in Patent No. 2,576,686, issued November 27, 1951, to the present inventor.

The present application includes in its disclosure structure found desirable for an improved functioning of banking cars such as roll banking arms operated by torsion sway bars and inclined shackles, described in applicant's co-pending application Serial No. 382,412, filed September 25, 1953, and also such as force diverters, arranged between the superstructure and the banking running gear to secure rigidity between the two and similar to those described in applicant's co-pending application Serial No. 400,313, filed December 24, 1953.

The present application is also related to banking arms with intermediary support for wheel half-axles such as disclosed in Patent No. 2,580,557, issued January 1, 1952, and Patent No. 2,660,254, issued November 24, 1953, to the present inventor.

This invention is directed to the specific and multiple use of certain suspension parts to thereby secure superstructure banking with fewer and simpler structural members.

Since vehicle banking is not an absolute necessity for solving the problem of automotive passenger transportation but a luxury feature to be incorporated into automobiles to increase the riding comfort of the passengers, the main obstacle against its general acceptance is the addition in cost, weight and complication which the banking car structure requires.

Having in previous patents and patent applications disclosed a number of elements essential to secure automatic, centrifugal force induced banking, the present invention constitutes in the main and has as its primary object the disclosure of a vehicle running gear suitable for securing a banking turn for the superstructure during curve ride in which fewer, lighter, and simpler elements are provided than has heretofore been disclosed.

Another object is to control the torsional deflection of the vehicle main support torsion springs during the banking turn so as to avoid increased deflection due to the superstructure banking turn.

Another object is to avoid concentration of forces due to cantilever arrangements within the structure by locating the inclined banking hinges as near as possible to the wheel supporting spindles and the front wheel king-pin axes.

Another object of the invention is to employ suspension parts with less restrictions as to their functioning with regard to other parts, whereby all said parts comprise the banking arm suspension.

Another object is to distribute the forces entering the vehicle from the road over a wider area along the frame or engine carrying body.

Another object is to arrange wheel suspension parts in an improved manner to secure increased use for guiding the superstructure relative to the wheels both in straight ahead and in curve ride.

Another object of the invention is to provide a novel combination of means for securing banking which meets the rigid running gear requirements of high speed automobile drive.

Another object is to provide suitable arrangements for such essential chassis parts as shock absorbers, stops or bumpers, and front wheel steering rods within the structure of this particular invention.

The invention utilizes vehicle supporting main torsion springs as a source of controlled turning motion about a substantially longitudinally extending axis to thereby transform a two axes universal joint located at the end of the spring into a multi-axis universally movable joint as required at the outer end of a banking arm.

The invention employs a banking arm like guiding link within a roll banking arm comprising said link in addition to the respective wheel and wheel or axle guiding structure.

According to this invention a highly controlled freedom for the banking turn of the superstructure is achieved within wide boundaries of space within the running gear without interference with standard exterior and interior space requirements or restrictions.

The drawings furnished herewith illustrate the invention as presently contemplated and described hereinafter.

The drawings in general illustrate vehicles of the passenger automobile type having a superstructure or body shown in broken outline in some of the figures and represented more positively in full outline as the chassis and body support frame 1 supported by the wheels 2 on the road. The wheels 2 are arranged in pairs, one pair at the front end and the other pair at the rear end of the superstructure. The wheels of each pair are disposed on opposite sides of the superstructure and are equally spaced from the longitudinal vertical center plane of the superstructure.

The wheels 2 are secured to the superstructure 1 by wheel or axle carriers 3, which provide for vertical oscillation of each wheel relative to the superstructure. The wheel or axle carriers 3 are arranged in pairs similar to the wheels and each pair is employed for connecting the corresponding pair of wheels to the superstructure.

The front wheels 2 and their corresponding wheel carriers 3 form a front pair of roll banking arms which support the front end of the superstructure. Each front wheel carrier 3 consists of an upper control arm 4 pivotally attached to the frame 1 by the substantially longitudinally extending hinge 5 and connected by the ball and socket joint 6 to the wheel supported member 7 which also serves as a steering kingpin, and of a lower suspension arm 8 comprising a transversely extending leg 9 and a longitudinally extending leg 10 which also serves as a vehicle main support torsion spring for the corresponding share of the weight of the car.

The transversely extending leg 9 of each lower suspension arm 8 is pivoted at its outer end by the universally movable ball and socket joint 11 to the wheel supported member 7 and at its inner end by the universally movable ball and socket joint 12 to a longitudinally extending lever 13 pivoted by a substantially vertically placed pivot 14 to the frame 1. The lever 13 serves both transversely extending legs 9 as a common inner end support.

The longitudinally extending leg and torsion spring 10 of the lower suspension arm 8 is attached at its rearward end to the frame 1 by a universal joint 15 comprising a substantially horizontally extending axis shaft 16 and a substantially vertically extending axis shaft 17. The forward end of the torsion spring 10 is pivotally connected to the transversely extending leg 9 by a hinge 18 extending preferably inclined towards the longitudinal and transverse center planes extending intermediate the pairs of wheels of the vehicle. The hinge 18 will be referred to hereinafter as king pin-banking hinge to mark its increased functioning as guiding rather than load carrying member.

Figure 1:
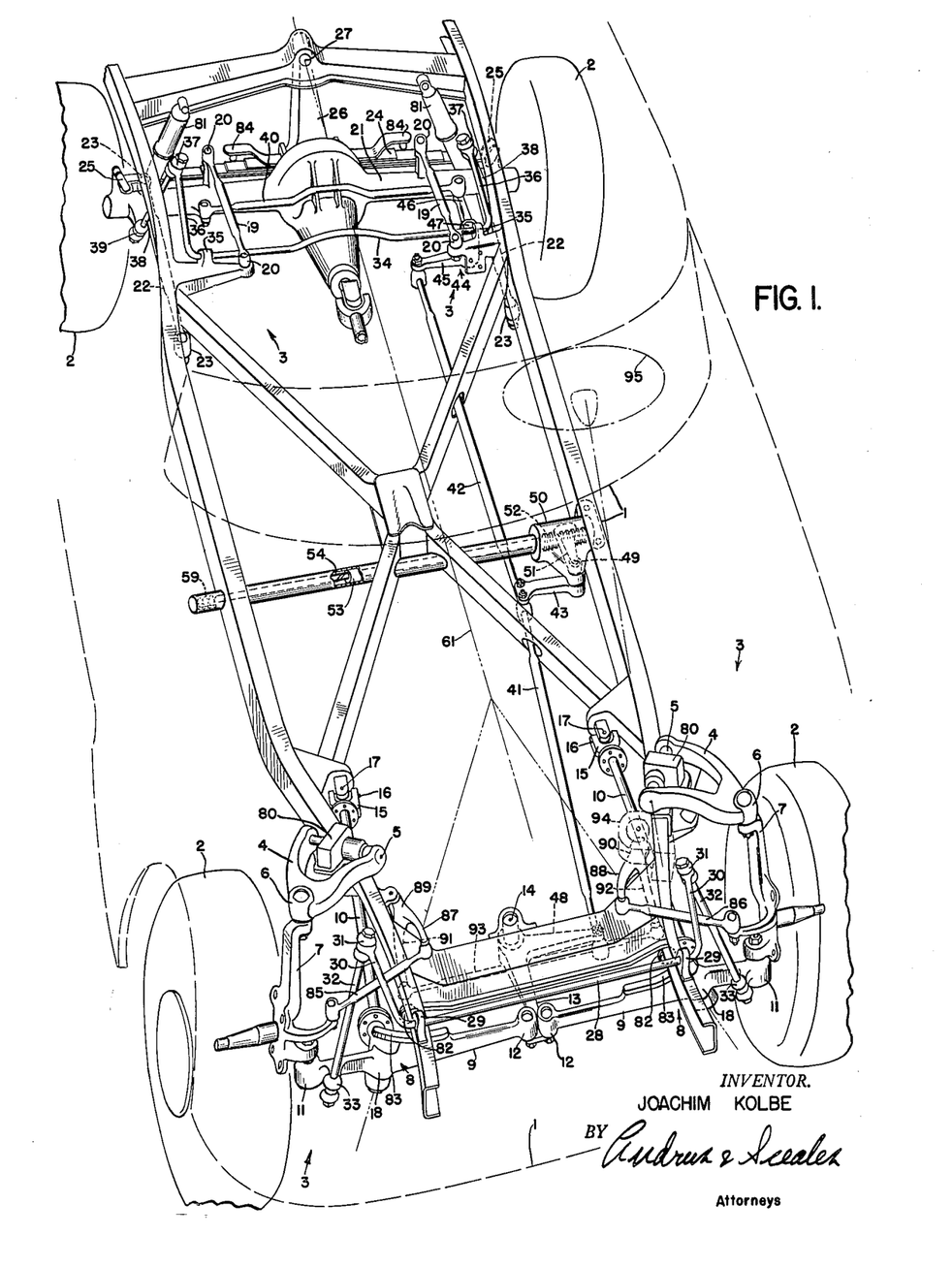
Figure 1 is a perspective view of the vehicle mounting including the improved banking arms and the overall suspension arrangement according to this invention.

The rear wheel or axle carriers 3 comprise, in the vehicle illustrated in Fig. 1, an upper pair of radius rods 19, connected by universally movable joints such as, for instance, ball and socket joints 20 at their forward ends to the frame 1 and at their rearward ends to the axle housing 21, and further comprise a lower pair of radius rods 22, connected by the universally movable joints 23 at their forward ends to the frame 1 and at their rearward ends to the axle housing 21.

A transversely extending rear spring 24 constitutes a common resilient means for the pair of rear axle carriers 3. The spring 24 is attached by the shackles 25 to the axle housing 21 and by the center support column 26 to the frame 1. A longitudinally extending pivot 27, located approximately in height of the mass center of the superstructure 1 is interposed between the support column 26 and the frame 1.

A sway bar 28 is attached in the front of the vehicle by the bearings 29 to the frame 1. The outer ends of the sway bar 28 form longitudinally extending sway bar arms 30 which are connected by pivotal or rubber bearings 31 to inclined sway bar shackles 32. The shackles 32 are connected by pivotal or rubber bearings 33, which are spaced farther apart than the upper shackle bearings 31, to the outer ends of the transversely extending legs 9 of the lower front suspension arms 8.

In the rear of the vehicle a similar sway bar 34 is supported by the bearings 35 to the frame 1 and comprises longitudinally extending arms 36 on either end, which are connected by upper pivotal or rubber bearings 37 to the inclined shackles 38 with lower pivotal or rubber bearings 39, also spaced farther apart than the upper pivots 37, connecting the shackles 38 to the rear axle housing 21.

Describing the operation of the mechanism disclosed, the use of the longitudinally extending legs 10 of the lower front suspension arms 8 as vehicle main support torsion springs permits an oscillation turn of the transversely extending legs 9, increasing the torsional deflection of the springs with upward move of the wheels either individually or as a pair, and decreasing it with downward move.

For oscillation movement of the front wheels as a pair no influence is exerted on the sway bar 28, while individual wheel oscillation movement will be resisted by the sway bar 28 and oppositely directed wheel oscillation movement will be resisted to twice the extent of single wheel oscillation movement for the same distance of travel of each wheel.

Oppositely directed wheel oscillation movement is typical for curve ride of the vehicle, the curve outside wheel receiving additional loading and the curve inside wheel decreasing its loading under the influence exerted by centrifugal force on the vehicle. Any tendency of the sway bar 28 to deflect within the mechanism of this invention causes an upwardly directed reaction load on the curve outside against the frame 1 and a downwardly directed reaction load on the curve inside against the frame 1.

Whenever the reaction loads of the sway bar 28 are allowed to become effective during release of the so-called force diverter as described hereinafter, the kingpin banking hinges 18, the universal joints 15, and the lever arm 13 with the ball and socket joints 12 will turn about their respective axes and permit the superstructure 1 to turn about its own longitudinally extending center of mass axis. This turn motion of the superstructure will be progressively increased and accelerated due to the inclination of the sway bar shackles 32 as explained in the pending application Serial No. 382,412 referred to above. In the rear of the vehicle the sway bar 34 with the shackles 38 operate similarly, lifting the superstructure on the curve outside and lowering it on the curve inside while turning it about the single column support pivot 27 which is located substantially in the height of the center of mass of the superstructure.

The use of the front main support torsion springs 10 is effected by the operation of the universal joints 15, connecting them to the frame 1, in combination with the operation of the king pin banking hinges 18, connecting them to the transversely extending legs 9 of the lower suspension arms 8. The axes of the king pin banking hinges 18 are placed in a position which will neither substantially increase nor decrease the natural torsional deflection in the corresponding spring 10 during the banking turn of the superstructure. The torsional deflection will be determined solely by the loading on the wheels and will be the same for a given curve taken at a given speed in the fully or partially banked vehicle as in a standard car equipped with the same spring negotiating the same curve at equal speed and not equipped with a sway bar. In this way the lateral shifting of the superstructure mass will be a function of wheel deflection only.

In further explaining the functioning of the mechanism according to this invention, if the banking turn mechanism were blocked while the vehicle negotiates a curve the frame 1 would lower itself relative to the road on the outside of the curve and would lift itself away from the road on the inside of the curve. The torsion spring 10 on the outside of the curve would increase its normal torsional deflection while the spring 10 on the inside of the curve would decrease its deflection. The outer end of the arm 30 of the sway bar 28 on the outside of the curve would lift itself relative to the frame 1, lowered on that side, but would maintain its height relative to the road. The outer end of the arm 30 located on the inside of the curve would lower itself relative to the frame 1, lifted on that side, but would maintain its height relative to the road. The superstructure would lean outwardly, while the vehicle negotiates a turn, just as is typical for standard cars.

If the blocking now were removed, the reaction loads of the sway bar 28 on the frame would lift it on the outside of the curve and lower it on the inside of the curve. Such motion will be accompanied by a shifting of the universal joint 15 located on the outside of the curve together with its attachment point to the frame towards the curve outside and a simultaneous lifting since the universal joint will follow the travel path of that particular frame point as determined by the inclination of the corresponding king pin banking hinge. On the curve inside a shifting of the universal joint towards the curve outside accompanied by a lowering of the universal joint would take place. The axes of the universal joints will change their positions relative to the road, maintaining them relative to the frame to which they are firmly attached, as viewed in front elevation. But the attachment plates between the torsion springs 10 and the king pin banking hinges 18 also change their positions relative to the road, turning an equal amount of degrees about their respective king pin banking axes while shifting laterally relative to the superstructure. Since both ends of each torsion spring are turned an equal amount during the banking process, deflection due to banking will be avoided.

Only where especially desired, for instance so as to improve the wheel to road positioning of independently suspended front or rear wheels, may an additional superstructure shifting be permitted. In that case, a change in inclination of either the king pin banking hinge axis or the axes of the corresponding universal joint or both may be utilized to secure such improvement, but at the expense of superstructure shifting due to increased or decreased wheel deflection, as the case may be.

It should be noted that while in standard cars sway bars are employed to decrease the outward lean of the vehicle under the influence of centrifugal forces of moderate magnitude and at the expense of softness of springing during curve ride, they serve in banking cars built according to this invention to actually secure the banking turn of the superstructure while maintaining the same softness of springing in curve ride as is normally attained in straight ahead ride. In both banking cars designed according to the invention and standard cars, the springing will soon be absorbed, and on the curve outside the bumper and on the curve inside the fully absorbed shock absorbers will restrict the oscillation motion of the wheels relative to the frame.

In the rear of the vehicle illustrated in Fig. 1, the banking of the superstructure about the hinge 27 as described above, will be accompanied by a normal deflection of the resilient means, in this case, the transverse leaf springs 24, as is typical for standard cars of similar construction, and in the same manner as if the vehicle were blocked against the banking turn.

In vehicle suspensions, where rigid axles are in use in combination with transverse leaf springs, a track bar, such as track bar 40 shown in Fig. 1, is frequently placed between axle and vehicle frame, to restrict relative lateral movement between axle and frame to a greater degree than the restriction secured by the spring shackles 25. In banking cars built for high speeds, relative lateral movement between front and rear running gear has been proved to be undesirable. To secure proper track holding between the front and the rear pairs of wheels of the vehicle, two longitudinally extending tie rods 41 and 42 have been provided. They are supported intermediate the length of the vehicle by the lever 43 carried by the frame 1.

A bell crank lever 44 comprising the transversely extending lever arm 45 and the longitudinally extending lever arm 46, is pivotally connected by the vertically extending pivot 47 to the frame 1 at the rear of the vehicle. The outer end of arm 46 is connected by a universally movable pivot such as a ball and socket joint to the track bar 40 which is attached by a similarly placed pivotal connection to the rear axle housing 21. The rear tie bar 42 is pivotally connected at its rear end to the outer end of lever 45. The front tie bar 41 is pivotally connected at its rear end to the lever 43 and at its forward end to the outer end of the lever arm 48 extending transversely from the centrally located lever arm 13.

The transversely extending lever arm 43 located intermediate the pairs of wheels forms an integral part with an arm 49 extending into the worm gear housing 50 and carrying a cam lever 51 which engages the irreversible worm gear 52, to form a force diverter mechanism as disclosed in pending U. S. Application Serial No. 400,313 referred to above. The mechanism in general as related to this invention is also shown in detail in Fig. 7.

Figures 6, 7:
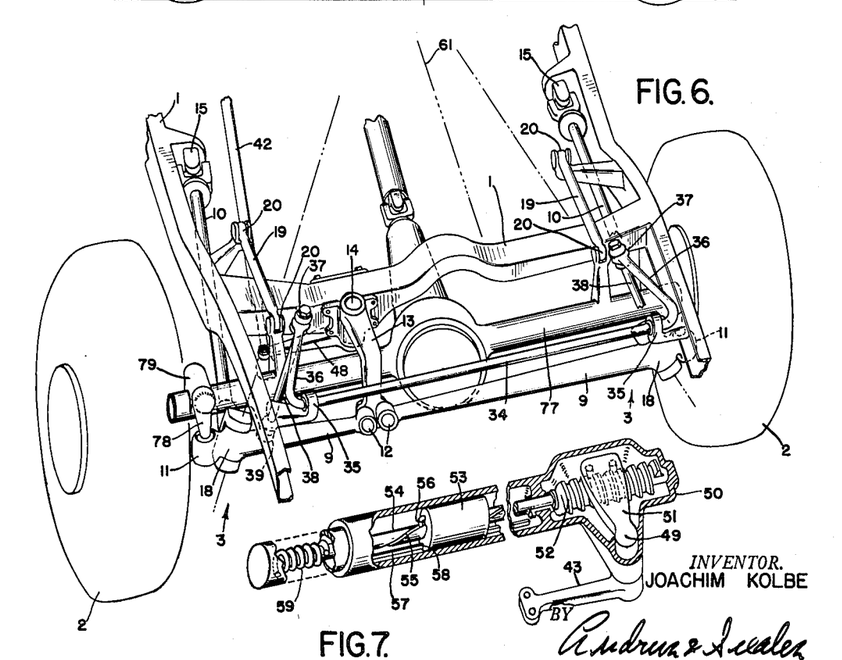
Fig. 6 is a perspective view of a rigid rear axle suspended to the superstructure of an automobile by a system of linkage and springs in accordance with this invention.
Fig. 7 is a perspective view partly sectioned and showing in detail the banking control mechanism illustrated in Fig. 1.

The speed up mechanism needed to turn the worm gear during curve ride and to position the lever arm 43 and therewith both the front and rear pair of roll banking arms, comprises a cylindrical steel block weight 53 sliding along the shaft 54 which carries the worm gear 52 as shown in Figs. 1 and 7, and turning it by having a high pitch thread 55 on the shaft serve as guide for a shaft supported bearing 56 carried by the weight block 53. The worm gear housing 50 may extend across the width of the vehicle and will protect the sliding weight block and its guides. A rail guide 57, extending longitudinally within the part of the housing 50 enclosing the shifting weight block 53 and corresponding keyway 58 on the block prevent turning of the weight block 53 relative to the housing 50.

A spring 59 which may be of the precompressed type and shown in Fig. 7 as a helical wind-up spring extending between the housing 50 and the shaft 54 will reposition the weight back into its central position during return of the superstructure to its normal upright position whenever the vehicle main support springs lose their curve deflection and sway bar reaction loads begin to exert turning pressure on the frame in a direction opposite to that causing the banking. Where the pitch of the thread 55 between shaft 54 and bearing 56 is flatter it may be well to employ a preloaded compressible coil spring at each end of weight block 53 in place of wind-up spring 59, so that the springs will tend to maintain block 53 in central neutral position in which gear 52 will hold lever 43 in central position, as shown in principle in application Serial No. 400,313, referred to above.

The size of the weight block 53 may be substantially reduced where an electrically, hydraulically or vacuum operated power assist unit is interposed between the shifting control weight and the worm gear, an arrangement similar to that disclosed in pending U. S. patent application Serial No. 400,313 referred to above.

As explained in this last named application, the force diverter mechanism constitutes a release mechanism only, permitting relative lateral movement between wheels and superstructure frame only during curve ride in response to lateral forces exerted on the superstructure such as centrifugal force but resisting such relative movement whenever the wheels, under the influence of lateral components of road shock forces tend to shift laterally and, in unison with initially small turns of the front wheels about their steering king pins begin to vibrate. Such swinging sometimes causes the whole running gear to shimmy violently at higher speeds.

The banking turn of the superstructure thus is "caused" by the sway bars, "guided" by the banking arms and shackles and only "controlled" by the force diverter, while standard spring deflection takes place under the influence of centrifugal forces.

Figure 2:
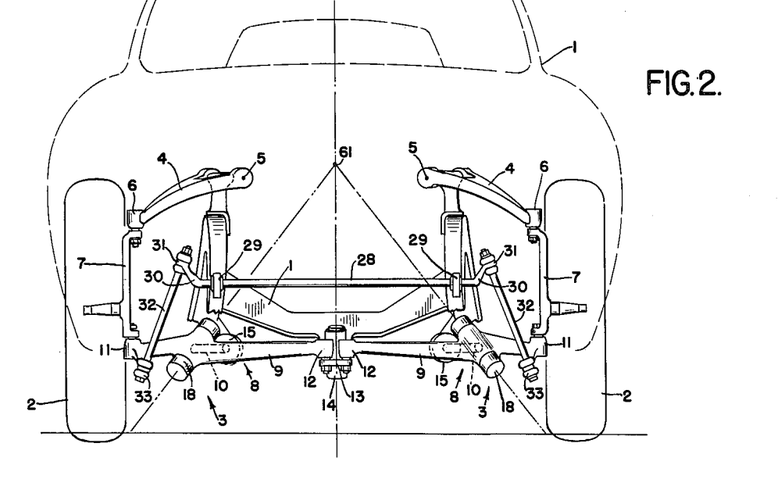
Fig. 2 is a schematic front elevation of some of the structure shown in Fig. 1.
Figure 3:
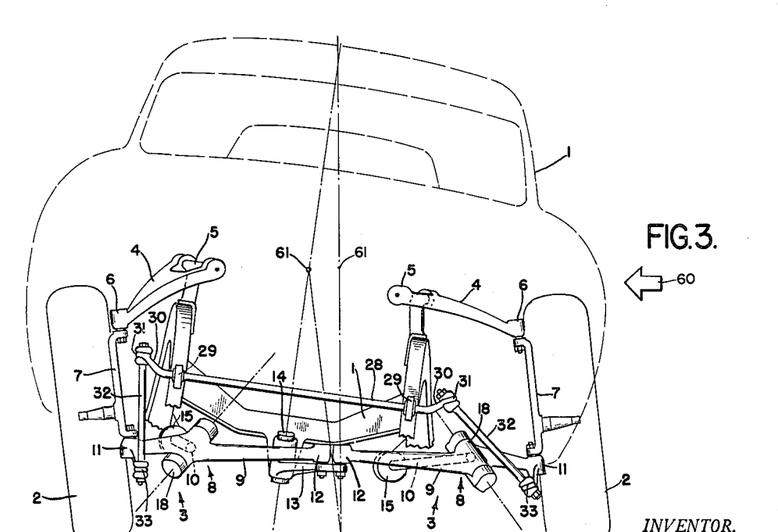
Fig. 3 is a front elevation of the structure shown in Figs. 1 and 2 with the superstructure turned into a banked position under the influence of sway bar reaction loads during curve ride.

Figure 2 illustrates in front elevation some of the structural elements of the front end of the vehicle shown in Fig. 1. Fig. 3 illustrates in front elevation the same mechanism shown in reaction to centrifugal force as indicated by the arrow 60. The lower part of the frame 1 has shifted laterally towards the outside of the curve, the vehicle roof has shifted to an even greater extent laterally towards the inside of the curve, both turning about the banking turn motion center 61. The ball joints 12 of the lower front suspension arm legs 9 substantially maintain their position relative to the road and the wheels. The sway bar shackle 32 on the curve outside has erected itself during the turn of the corresponding sway bar attachment point to the frame about the banking motion center 61. The sway bar shackle 32 on the inside of the curve has moved into a position increasingly inclined to the road during the turn of the corresponding sway bar attachment point to the frame 1 about the banking motion center 61. The shifting of the ball joints 12 relative to the frame is the result of the normal wheel deflection taking place, accompanied by upward lift of the frame by the sway bar shackle 32 on the curve outside and by downward pull by the sway bar shackle 32 on the curve inside, and repositioning the springs 10 while their torsional deflection takes place. This over all banking motion, however, can take place only while the weight block 53 located intermediate the front and rear of the vehicle shifts towards the curve outside.

Each pair of roll banking arms has its banking arms opposed and spaced laterally apart on opposite sides of the longitudinal center line of the superstructure and extending from the superstructure to the effective road support therefor with the ends of the arms embodying in effect a universally movable joint at one corresponding end of each arm and a skew pivotally effective banking axis at the other end of the arm. The plane of each roll banking arm of a pair of opposed arms containing the corresponding effective roll banking axis and the center of the universally movable joint therefor meets the plane of the other arm of the pair in a roll banking motion center axis for the pair passing substantially in the height of the effective center of mass for the portion of the superstructure supported by the pair of arms.

Figure 4:
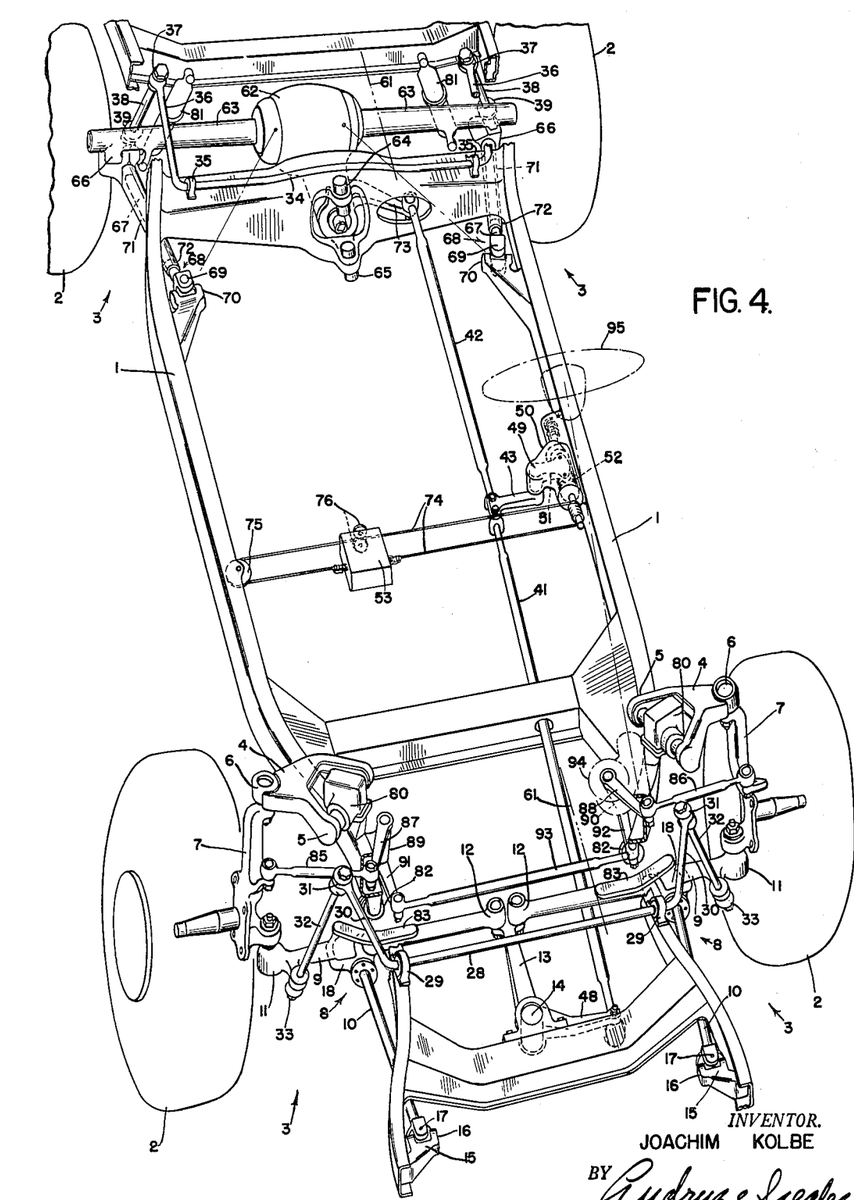
Fig. 4 is a perspective view of a vehicle mounting including rear pendulum axles with roll banking arms and disclosing the application and use of some of the principles and objects of this invention.

Fig. 4 discloses a vehicle wherein the front wheel suspension together with the king pin banking hinges 18 and the central front lever 13 forming the roll banking arm mechanism, are arranged in a direction opposite to that illustrated in Fig. 1 and placed in front of the pair of front wheels 2, and wherein so-called swing or pendulum half axles are employed in the rear of the vehicle in combination with torsion main support springs arranged according to the invention.

The description of the front end of the vehicle illustrated in Fig. 4 is otherwise identical to that given for Fig. 1 with identical reference characters used. In the rear, a differential housing 62 supporting the inner ends of half-axle housing units 63, each carrying a corresponding wheel 2 on its outer end, is pivotally connected to the frame 1 by an upper bearing 64 and a lower bearing 65. The axis determining the location of the bearings 64 and 65 is arranged to secure a travel path for the inner ends of the pendulum half axles 63 substantially parallel to the road and of equal fore or aft motion as the travel path for the outer ends of the pendulum half axles 63 during the banking turn. A desired travel path for the outer ends is secured by the king pin banking hinges 66 placed between the outer ends of the pendulum half axles 63 and the longitudinally extending torsion springs 67, which at their forward ends are attached to the frame by the universal joints 68 each comprising a substantially vertically extending axis 69 and a substantially horizontally extending axis 70. The transverse distance between the universal joints 68 will be less than the distance between the king pin banking hinges 66 to secure a small but equal rearward motion of both ends for the pendulum half axle located on the curve outside and a corresponding forward motion for the pendulum half axle located on the curve inside, whenever the vehicle negotiates a turn.

Since no upper suspension arms are provided, brake torque forces are carried from the wheel brakes to the frame 1 by torque tubes 71 rigidly attached to the hinge forks of the king pin banking hinges 66 at their rearward ends and carrying bearing supports 72 for the torsion springs 67 which are enclosed by these torque tubes, and free to deflect during wheel oscillation. The sway bar torsion spring 34 is attached by bearings 35 to the frame 1 and comprises rearwardly extending arms 36, which are connected to the outer ends of the pendulum half axles 63 by the shackles 38. This sway bar operates as described above to secure the banking turn of the superstructure. A single front or rear sway bar may be sufficient to secure banking.

During the banking turn and in the operation of the pendulum axle structure described, the laterally shifting lower part of the superstructure carries the differential hinge including the bearings 64 and 65 along, but permits the inner ends of the pendulum half axles to substantially retain their position relative to the road as shown in Fig. 2. The wheels 2 will maintain a vertical position relative to the road although spring deflection takes place. The main support torsion springs 67 will deflect according to their loading but the superstructure will nevertheless be lifted on the curve outside and lowered on the curve inside by the sway bar 34. The difference in height between the frame position relative to the deflected wheels will be compensated for and additionally increased or decreased respectively by the turn of the longitudinally extending torsion bar 67 of the corresponding rear wheel suspension arm about the nearest king pin banking hinge 66. Both during straight ahead ride and during superstructure banking, oscillation of each individual wheel is permitted to take place about a wheel oscillation axis extending from the inner end of the pendulum half axle to the corresponding universal joint connecting the forward end of the respective torsion spring to the frame. This axis changes its relative position to the frame during banking due to the lateral shifting of the differential housing, whereby the distance between the inner end of the pendulum half axle and the universal joint 68 connecting the torsion spring 67 to the frame 1 will increase on the curve outside, where increased wheel loading takes place, and decrease on the curve inside. This constitutes a favorable load distribution.

The differential housing 62, as pivoted to the frame 1 by the hinge bearings 64 and 65 constitutes the intermediate central support corresponding to the front suspension center support 13. As such, the housing 62 serves as one arm of a bell crank with the transversely extending lever 73 attached to the housing and constituting the other arm. The lever 73 is connected by the longitudinally extending rod 42 to a force diverter mechanism which, in the construction shown in Fig. 4, has its release weight 53 suspended and supported by a wire loop 74 carried on one end by a frame supported guide wheel 75 and arranged to turn the shaft of the worm gear 54 during lateral sliding of the weight under the influence of centrifugal forces. This turn is secured by the wire being slung a few times around the screw thread-like shaped outer end of the shaft 54, to avoid sliding between wire and shaft. The weight block 53 is shown as being connected to the two ends of the wire near its front end, thus completing the loop and supported by a guide double roller 76 on the wire at its rear end.

Figure 5:
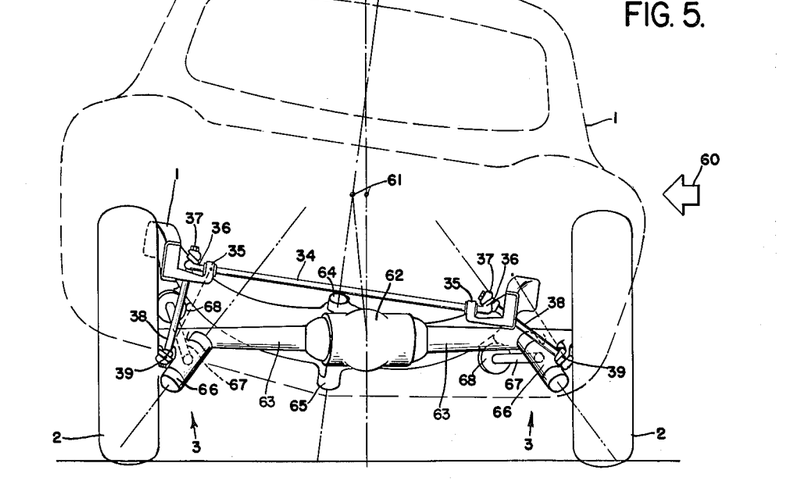
Fig. 5 is a schematic rear elevation of some of the structure shown in Fig. 4 with the superstructure turned into a banked position under the influence of sway bar reaction loads during curve ride.

The rear suspension illustrated in Figs. 4 and 5 has the advantages of being lower and providing for individual wheel oscillation of all four wheels of the vehicle.

Fig. 6 discloses a suspension according to the invention arranged to resiliently connect a rigid rear axle 77 to the superstructure of an automobile, employing nearly identical roll banking arm members as those used for the front suspensions illustrated. Identical reference characters therefore have been applied to facilitate the understanding of the functioning of the arrangement.

Upper torque rods 19 as described for Fig. 1 are maintained. A lower layer of suspension means similar to that employed in the front of the vehicle is employed comprising the transversely extending legs 9 with outer ball and socket joints 11 and inner ball and socket joints 12 and an inner support lever 13 carried by the frame 1 and placed somewhat out of center relative to the axle. The longitudinally extending torsion springs 10 with a universal joint 15 located at the forward end of each spring 10 and a king pin banking hinge 18 arranged between the leg 9 and the spring 10 constitutes the main members of the suspension. The longer one of the transversely extending legs 9 serves as a track bar between axle and superstructure and is connected to the rear axle by the outer ball and socket joint 11 directly. The shorter leg 9 serves as oscillating lever arm only and is connected at its outer end by the ball and socket joint 11 to a shackle 78 which in turn is hingedly connected to the axle 77 by the longitudinally extending hinge 79.

Where a mechanism is provided for securing an effective banking turn axis for the superstructure which is placed substantially lower than the desired effective axis, such as the mechanism disclosed in Fig. 6, an even higher effective banking turn axis location might easily be chosen for the rear end and combined with a somewhat lower effective banking turn axis chosen for the front of the vehicle, all height reference being related to the height of the center of mass of the vehicle. Such arrangement would make it possible to place the upper front suspension arms in a lower location and simultaneously keep the superstructure parallel to the car track during curve ride, while in present day cars with individual front wheel suspension and a rigid rear axle, the center of mass of the superstructure shifts farther to the outside in the front of the vehicle with its corresponding mass share than in the rear of the vehicle.

The structure disclosed in Fig. 6 can be applied to a rigid front axle as well as to a rear axle, as described.

The vehicles and vehicle sections illustrated and described above disclose in effect banking hinges carried at the outer ends of individual half axles and located in the front suspension disclosed near the wheel king pins. This arrangement greatly reduces the loads to be carried by these roll banking hinges. The whole process of turning the superstructure relative to the wheels during curve rides is in effect a matter of guiding suspension parts along predetermined paths. The roll banking hinges 18 shown in the front of both vehicles disclosed and in the rear of the vehicle section illustrated in Fig. 6 and the roll banking hinges 66 shown in the rear of the vehicle disclosed in Figs. 4 and 5 serve as banking motion king pins and have been named king pin banking hinges to clearly mark the progress in the development of banking arm structures.

To complete the description of the automobile chassis structures illustrated in the figures, hydraulic shock absorbers 80 in the front of the vehicles illustrated are shown as standard hydraulic double action units operated by the turn of the upper suspension arms 4 about their inner hinges. In the rear, direct acting piston type shock absorbers 81 are, where shown, extending between the frame 1 and the outer ends of the rear axle housings. The shock absorbers can be placed in this position without danger of directing the wheel or axle suspensions into a path which allows the shock absorber to evade operation, as has happened previously, because now the force diverter unit (49 to 59) resists any such undesirable travel.

The force diverter control mechanisms function in a similar manner against undesirable displacements of the wheel or axle suspensions while corresponding suspension members hit the bumpers which are shown in front of the vehicles illustrated in Figs. 1 and 4, as small rubber wheels 82 attached to the frame 1, with corresponding hitting plates 83 extending a short distance along the transversely extending legs 9 of the lower suspension arms. In the rear of the vehicle illustrated in Fig. 1, the bumpers are placed along brackets 84 extending transversely from the center support column 26.

Finally, the front wheels of the vehicles illustrated are shown as being steered individually by drag links 85 and 86, the inner ends of which are placed at the center point of the travel arcs which the outer ends will describe not only during wheel oscillation but also during simultaneous banking, whereby a small compensating turn of the wheels about their king pin axes takes place to avoid change of any given steered position during superstructure banking and wheel oscillation unless the drag links are actually placed in the height of the upper front suspension arms 4.

The inner ends of the drag links 85 and 86 are supported by ball and socket joints to the diagonally extending upper arms 87 and 88 of bell cranks 89 and 90, with the outer ends of the corresponding longitudinally extending lower arms 91 and 92 of the bell cranks interconnected by the tie rod 93. The bell crank 89 is directly connected to the frame 1. The bell crank 90 might be pivoted directly in the steering housing 94 which also houses the steering gear which operates the steering during the turn of the steering wheel 95. The theory and descriptive geometry for banking cars with a banking motion center located above the wheel oscillation motion centers has been disclosed in U. S. Patent No. 2,581,030, issued June 1, 1952, to the present inventor.

Although the vehicle structures described in this application differ from those disclosed in U. S. Patent No. 2,581,030, in that the centrifugal force causes the banking turn indirectly only by means of the wheel suspension deflection with pendulum-like spring action instead of directly by suspending the superstructure in form of a pendulum, the same rules which cover the layout for the steering described in the above patent also govern the layout of the present structures and are therefore referred to above.

The lowering of the motion center for the banking turn of the vehicle superstructure from a zone located substantially above the center of mass of the superstructure into a zone approximately in the height of this mass contributes in itself greatly to the desired simplification of the design by reducing the length of travel for all parts repositioned during the banking turn, and has additional significance in connection with the arrangement of the main support torsion springs 10 according to this invention, in that extremes are avoided and that the workability of the springs, placed and repositioned as disclosed, is not materially affected by the turning move of the superstructure.

Various modes of carrying out the invention are contemplated as within the scope of the following claims particularly pointing out and distinctly claiming the subject matter which is regarded as the invention.

I claim:

1. A vehicle comprising a superstructure adapted to roll bank on turns, at least one set of roll banking arms disposed to support each corresponding end of the superstructure upon a pair of wheels, each set being connected to the superstructure and constituting at least a pair of opposed roll banking arms spaced laterally apart on opposite sides of the longitudinal center line of the superstructure and extending from the superstructure to the effective road support therefor with the ends of the arms for each pair of roll banking arms embodying in effect a universally movable joint at one corresponding end of each arm and a skew pivotally effective banking axis at the other end of the arm, means including longitudinally extending levers located intermediate the wheels and interconnecting the roll banking arms of each pair to retain said effective universally movable joints for the corresponding pair in substantially constant spaced relation, each roll banking arm including a wheel suspension arm comprising a transversely and a longitudinally extending leg, a king pin banking hinge pivotally interconnecting the outer ends of said legs and placed to control the turn of the roll banking arm about said skew pivotally effective banking axis, the longitudinally extending leg of each pair constituting the resilient support for the corresponding part of the superstructure, the plane of each roll banking arm of a pair of opposed arms containing the corresponding effective roll banking axis and the center of the universally movable joint therefor meeting the plane of the other arm of the pair in a roll banking motion center axis for the pair passing substantially in the height of the effective center of mass for the portion of the superstructure supported by the pair of arms, additional resilient means and related guiding means disposed to roll the superstructure into a banker position during curve ride, a tie interconnecting the front and rear superstructure support structure, a self-locking reduction gearing carried by the superstructure and connected to said tie to block relative lateral shifting between the superstructure and wheels tending to result from wheel road shock forces, and a weight movable in response to centrifugal action exerted when the vehicle turns to operate said reduction gearing in a direction adjusting said blocking to provide for movement of said tie and banking of the superstructure.

2. A vehicle comprising a superstructure adapted to bank on turns, at least one set of banking arms disposed to support each corresponding end of the superstructure, each set being connected to the superstructure and constituting at least a pair of opposed banking arms spaced laterally apart on opposite sides of the longitudinal center line of the superstructure and extending from the superstructure to the effective road support therefor with the ends of the arms for each pair of banking arms embodying in effect a universally movable joint at one corresponding end of each arm and a skew pivotally effective banking axis at the other end of the arm, and means including longitudinally extending levers interconnecting the banking arms of each pair to retain said effective universally movable joints for the corresponding pair in substantially constant spaced relation, each banking arm including a wheel suspension arm comprising a transversely and a longitudinally extending leg, and a king pin banking hinge pivotally interconnecting said legs and spaced near the outer ends of said legs and arranged to control the turn of the roll banking arm about said skew pivotally effective banking axis, the longitudinally extending leg of each pair constituting the resilient support for the corresponding part of the superstructure, and the plane of each banking arm of a pair of opposed arms containing the corresponding effective banking axis and the center of the universally movable joint therefor meeting the plane of the other arm of the pair in a banking motion center axis for the pair passing substantially above the effective center of mass for the portion of the superstructure supported by the pair of arms.

3. The combination of claim 2 and a tie interconnecting the front and rear sets of banking arms, a self-locking reduction gearing connected to said tie and blocking movement thereof under influences arising from road shock forces on the wheels, means operable in response to centrifugal forces to actuate said gearing and facilitate banking movement of the superstructure, and additional resilient means to effect banking movement of the superstructure.

4. The combination of claim 2 wherein said longitudinally extending leg constituting the resilient support for the corresponding part of the superstructure is a torsion spring connected to the superstructure by a two-axis universal joint.

5. The combination of claim 1 wherein the front roll banking arms located in the front of the vehicle include upper and lower wheel suspension arms pivotally secured to the superstructure.

6. The combination of claim 1 wherein guide plates are carried by the transversely extending legs of the suspension arms, stops are carried by the superstructure and positioned to touch said guide plates after a predetermined wheel oscillation has taken place, and wherein lateral motion between said stops and guide plates is made possible to secure intermediate and full banking of the superstructure.

7. The combination of claim 1 wherein steering of the front wheels is secured by individual drag links, the inner end of each drag link being placed in the center of the arc described by the corresponding outer end during the combined banking and oscillation motion of the corresponding wheel, thereby keeping said wheel in the direction set for the curve ride without interferences by the banking motion, and wherein said outer ends of said drag links are carried by wheel steering arms while said inner ends are interconnected by means of bell cranks and a tie rod carried by the superstructure.

8. A vehicle comprising a superstructure adapted to roll bank on turns, a set of front and a set of rear wheel carriers disposed to support said superstructure and spaced longitudinally of the same, each front wheel carrier comprising a wheel spindle member, an upper wheel suspension arm pivotally connected at its inner end to the superstructure, a ball and socket joint connecting said arm to said wheel spindle member, a lower wheel suspension arm composed of a transversely and a longitudinally extending leg, a universal joint connecting each longitudinally extending leg at its inner end to the superstructure, an inclined king pin banking hinge connecting each longitudinally extending leg at its outer end to the corresponding transverse leg intermediate the ends of the latter, a pivotal support for the inner ends of said transverse legs pivotally carried by the superstructure, a ball and socket joint connecting the outer end of each transverse leg to the corresponding wheel spindle member, and lever means stabilizing the position of said pivotal support to control the banking of the superstructure on turns, said longitudinally extending legs constituting torsion means for resiliently supporting the superstructure upon said front wheel carriers.

9. The combination of claim 8 in which each rear wheel carrier comprises a pendulum half axle having a housing pivotally carried at its inner end by a differential housing, means pivotally carrying the differential housing from the superstructure, a torsion spring connected by an inclined banking hinge structure to the axle housing near the outer end thereof and extending generally longitudinally of the vehicle, a universal joint between the torsion spring and the superstructure, and a torque tube housing said torsion spring and secured rigidly to the banking hinge structure and having a bearing housing for said torque tube near said universal joint.

10. A vehicle comprising a superstructure adapted to roll bank on turns, a front set of wheel carriers and a rear set of axle carriers for the support of the superstructure, each set of wheel or axle carriers constituting at least a pair of opposed roll banking arms, each said front roll banking arm including a wheel, a wheel spindle member, an upper wheel suspension arm, a lower wheel suspension arm comprising a transversely extending and a longitudinally extending leg, said longitudinally extending leg serving as resilient means for the support of the corresponding share of the superstructure, a king pin banking hinge interposed between the transversely and the longitudinally extending leg to secure guiding of the superstructure about its center of mass, and intermediate support leverage connecting the inner ends of said transverse legs for the pair of front roll banking arms, each said rear banking arm including a rear suspension arm extending between the frame and the rigid rear axle housing and comprising a transversely and a longitudinally extending leg interconnected by a king pin banking hinge, said longitudinally extending leg constituting a resilient support for the corresponding share of the superstructure and being connected to the superstructure by a universal joint, one of the transversely extending legs being connected at its outer end to the rear axle housing by a ball and socket joint, the other transversely extending leg being connected to the rear axle by a shackle including a lower ball and socket joint and an upper longitudinally extending hinge, an intermediate frame supported lever carrying the inner ends of the transversely extending legs, and a pair of upper torque rods interconnecting the axle housing and the frame.

11. A vehicle comprising a superstructure adapted to roll bank on turns, a front set of wheel carriers and a rear set of axle carriers for the superstructure, each set of wheel and axle carriers constituting at least a pair of opposed roll banking arms, each said front roll banking arm including a wheel, a wheel spindle member, an upper suspension arm, a lower suspension arm having a transversely and longitudinally extending leg, the longitudinally extending leg serving as a resilient means for supporting the corresponding share of the superstructure, said legs being interconnected by a king pin banking hinge arranged to provide for a banking motion center located substantially in the height of its center of mass, and an intermediate support lever between the transversely extending legs and carried by the frame, each said rear banking arm including a longitudinally extending and a transversely extending leg, the longitudinally extending leg serving as a resilient support for the corresponding share of the superstructure and the legs being interconnected by a king pin banking hinge, the inner ends of the transversely extending legs being supported by a frame supported lever, the outer ends being supported by ball joints carried on one side of the vehicle directly by the rigid axle and at the other side of the vehicle by a shackle attached to the rigid axle by a longitudinally extending hinge, said wheel carriers being arranged to secure a banking motion center located in the height of the center of mass of the superstructure, resilient means including at least one transversely extending torsion sway bar hingedly connected to the superstructure with operating arms extending therefrom at their outer ends in a longitudinal direction, inclined shackles pivotally connected to the operating arms and to opposed wheel carriers and arranged to secure increased and accelerated roll banking of the superstructure during curve ride, a front to rear tie connecting at least one roll banking arm disposed in the front of the vehicle to one roll banking arm disposed in the rear of the vehicle to induce the front and rear pairs of roll banking arms to move laterally substantially in unison during the roll banking of the superstructure, means connecting the superstructure and said front to rear tie including irreversible gear mechanism and rigidly preventing relative lateral movement between the wheels and the superstructure, and means responsive to inertia forces to release said preventive means to permit relative lateral movement between the superstructure and the running gear effected by similar inertia forces, as in banking of the superstructure.

12. A vehicle comprising a superstructure adapted to roll bank on turns, a rear rigid axle structure disposed transversely of the superstructure to support a corresponding part thereof, a set of axle carriers for said axle structure extending between the same and the superstructure and comprising at least two longitudinally extending torque rods attached by universally movable means at one end to the superstructure and at the other end to the axle, transversely extending resilient means carried by the superstructure, shackles supporting the ends of said resilient means by said axle structure, a longitudinally extending hinge carried by the superstructure in the height of the center of mass of the superstructure, means pivotally carried by said hinge and rigidly connected to said resilient means intermediate the ends of the latter, a banking support for the remainder of the superstructure including independently suspended front wheel carriers correlated to the movement of the superstructure upon the axis of said longitudinally extending hinge to guide the superstructure in its rotational banking movement, each of said front wheel carriers comprising upper and lower suspension arms, a part of each of said lower suspension arms constituting a resilient means including a torsion bar disposed to provide for vertical oscillation of the outer end of the corresponding carrier, said lower suspension arms also comprising roll banking hinges placed near their outer ends for guiding their inner ends along travel arcs with the center of mass of the superstructure being the center of said arcs and substantially of the roll banking motion for the superstructure, each wheel carrier and axle carrier being opposed during single wheel oscillation by a separate spring, a tie connecting the front and rear roll banking arms to induce them to move laterally in unison as the superstructure rolls into its banked position, a self-locking gear set connecting the superstructure and the running gear and constituting a force diverting device to block lateral turn of the superstructure about the banking motion center when initiated by lateral force components resulting from forces exerted on the wheels, and means to operate said gear set to permit lateral turn of the superstructure about the banking motion center in response to centrifugal forces exerted on the vehicle.

13. A vehicle comprising a superstructure adapted to roll bank on turns, a plurality of sets of roll banking arms disposed to support the superstructure and spaced longitudinally of the same, each set of roll banking arms being connected to the superstructure and constituting at least a pair of opposed roll banking arms spaced laterally apart on opposite sides of the longitudinal center line of the superstructure and extending from the superstructure to the effective road support therefor with the ends of the arms for each pair of roll banking arms embodying in effect a universally movable joint at one corresponding end of each arm and a skew pivotal banking axis at the other end of each arm, each of said roll banking arms being articulated to provide for vertical oscillation of one end relative to the other upon an effective oscillation pivotal axis, the articulation structure including suspension arms each comprising a pair of pivotally interconnected legs extending in an angular direction relative to each other, one of said legs constituting the resilient support means for the corresponding share of the superstructure, additional support members pivotally attached to the superstructure and located intermediate the pair of wheels, said additional support members constituting means interconnecting the banking arms to retain the effective universally movable joints in substantially constant spaced relation, and a self-locking gear set connecting the superstructure and said banking arms and arranged to block turn of said banking arms relative to said superstructure initiated by forces exerted on the wheels without interfering with the turn of said banking arms relative to the superstructure in response to centrifugal forces exerted on the superstructure during curve ride of the vehicle, and a sway bar to initiate turn of the superstructure in response to centrifugal forces during curve ride.

14. In a vehicle having a superstructure adapted to bank on turns, front and rear wheels and wheel support members, guiding means extending between the wheel support members and the superstructure and including suspension arms comprising transversely and longitudinally extending arms interconnected by king pin banking hinges, said longitudinally extending arm constituting torsion springs, the axis of each of said king pin banking hinges being upwardly inclined towards the longitudinal axis of the vehicle and away from the wheel with which it is associated, whereby lateral forces acting upon the superstructure will tend to rotate the same about a longitudinal axis located substantially in the height of its center of mass to cause it to roll bank, additional resilient means comprising a sway bar resisting at an increased rate oppositely directed wheel oscillation of a pair as compared to single wheel oscillation and leaving free parallel wheel oscillation of the corresponding pair of wheels, said increased resistance being utilized to secure said roll banking during curve ride, guiding means disposed to induce the front and rear wheel carriers to move laterally in unison as the superstructure rolls into its banked position, and a gear mechanism constituting a force diverter device and arranged to carry forces exerted on the running gear into the superstructure and to permit the superstructure to bank in response to centrifugal forces exerted on the superstructure.

15. In a vehicle, a superstructure constituting the sprung weight of the vehicle, a plurality of pairs of wheels for supporting the same, at least one of said pairs of wheels constituting the drive wheels therefor, a spring cushioned banking suspension structure including said drive wheels, a differential housing hingedly supported by the superstructure and disposed between said pair of drive wheels and constituting a part of the sprung weight of the vehicle, two pendulum half axles with housings therefor extending pivotally from said differential housing to each of said drive wheels, longitudinally extending torsion bars connected by two axis universal points to the superstructure and by inclined king pin banking hinges to corresponding pendulum half axle housings, torque tubes rigidly attached to the king pin banking hinge forks at their rearward ends and providing for a bearing support for said torsion springs at their forward ends, and sway bars carried by the superstructure and having inclined sway bar shackles connecting the outer ends of the sway bars to the suspension structure and arranged to provide reaction loads on the superstructure during curve ride effecting a turn of the superstructure into a banked position, whereby the natural deflection of the longitudinally extending torsion springs during curve ride is substantially maintained.

16. A vehicle comprising a superstructure adapted to roll bank on turns, at least one set of roll banking arms disposed to support each corresponding end of the superstructure, each set being connected to the superstructure and constituting at least a pair of opposed roll banking arms spaced laterally apart on opposite sides of the longitudinal center line of the superstructure and extending from the superstructure to the effective road support therefor with the corresponding ends of the arms for each pair of roll banking arms embodying in effect a universally movable joint constituting the wheel to road contact joint at one corresponding end of each arm and a skew pivotally effective banking axis at the other end of the arm, and means including longitudinally extending levers located intermediate the wheels and interconnecting the roll banking arms of each pair to retain said effective universally movable joints for the corresponding pair in substantially constant spaced relation, each banking arm including a wheel or axle suspension arm comprising a transversely and a longitudinally extending leg interconnected by a king pin banking hinge, and a two axis universal joint connecting the longitudinally extending leg to the superstructure to provide the main resilient support for the share of the superstructure carried by the corresponding wheel and furnish in association with the king pin hinge a guiding link within the roll banking arm, and the longitudinal axis of the torsion bar itself serving as a third axis of motion to secure controlled universal freedom of motion for said end.

References Cited in the file of this patent
UNITED STATES PATENTS

| | | |
|---|---|---|
| 2,657,067 | Kolbe | Oct. 27, 1953 |
| 2,696,387 | Nordin | Dec. 7, 1954 |